US008358706B2

United States Patent
Itou et al.

(10) Patent No.: US 8,358,706 B2
(45) Date of Patent: Jan. 22, 2013

(54) APPARATUS AND SYSTEM TO MULTIPLEX DATA ON A PLURALITY OF DIGITAL FRAME IMAGES INTO DATA ON ONE FRAME AND TO ENCODE AND TRANSMIT THE DATA

(75) Inventors: Yasuhiro Itou, Kawasaki (JP); Shin Fujita, Kawasaki (JP); Seiichi Kakinuma, Yokohama (JP); Yasushi Umezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1626 days.

(21) Appl. No.: 11/365,681

(22) Filed: Mar. 2, 2006

(65) Prior Publication Data

US 2006/0238826 A1 Oct. 26, 2006

Related U.S. Application Data

(63) Continuation of application No. PCT/JP03/11664, filed on Sep. 11, 2003.

(51) Int. Cl.
*H04N 7/12* (2006.01)
(52) U.S. Cl. .................................................. 375/240.28
(58) Field of Classification Search ............. 375/240.28
See application file for complete search history.

(56) References Cited

U.S. PATENT DOCUMENTS

| 6,456,335 B1 * | 9/2002 | Miura et al. ................... 348/588 |
| 2004/0075741 A1 * | 4/2004 | Berkey et al. ................. 348/159 |

FOREIGN PATENT DOCUMENTS

| JP | 08-205134 | 8/1996 |
| JP | 08-307856 | 11/1996 |
| JP | 10-164589 | 6/1998 |
| JP | 11-234654 | 8/1999 |
| JP | 11-346370 | 12/1999 |
| JP | 2001-086486 | 3/2001 |

OTHER PUBLICATIONS

International Application WO 2005/027518 dated Mar. 24, 2005.

* cited by examiner

*Primary Examiner* — Jay Patel
*Assistant Examiner* — Richard Torrente
(74) *Attorney, Agent, or Firm* — Staas & Halsey LLP

(57) ABSTRACT

An image transmitting apparatus includes input terminals, first frame buffers corresponding to the input terminals, a write controlling portion, a read clock generating portion, a read controlling portion, an image compressing portion, and an image transmitting portion. The image transmitting apparatus inputs data on digital frame images of one frame captured with video cameras and synchronous signals synchronized with the data on the digital frame images, respectively, within a predetermined period of time; processes the data including multiplexing and compressing the data; and outputs the data on the digital frame images encoded by the image compressing portion.

8 Claims, 9 Drawing Sheets

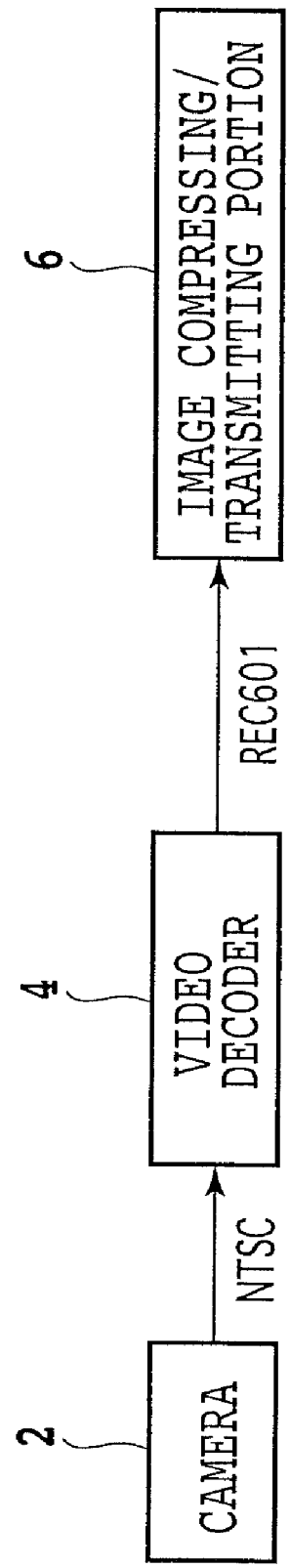

APPARATUS AND SYSTEM TO MULTIPLEX DATA ON A PLURALITY OF DIGITAL FRAME IMAGES INTO DATA ON ONE FRAME AND TO ENCODE AND TRANSMIT THE DATA

This is a continuation of PCT International Application No. PCT/JP03/11664, filed Sep. 11, 2003, which was not published in English.

BACKGROUND OF THE INVENTION

1. Field of the Invention

The present invention generally relates to an image transmitting apparatus for digitally processing an analog video signal, and more particularly to an image transmitting apparatus and an image transmitting system which are capable of efficiently supplying digital image data to a plurality of applications in real time by using a common bus construction.

2. Description of the Related Art

In recent years, along with rapid spread and high speed promotion of a digital network typified by an Internet Protocol (IP), a demand of video contents delivery, and video transmission in a monitoring system or the like is in the progress of increasing. At the same time, for a utilization range of an image as well, the number of application systems for invader detection through image processing using an advanced processor in addition to simple transmission has increased. Apparatuses for realizing these application systems show the spreading from the conventional expensive dedicated apparatus to a miniature desk-stand apparatus and a PC installation type ad-in board depending on the applications. In future, it is estimated that an application for executing data processing such as image recognition, image compression, and image accumulation for a plurality of image inputs is merged therewith, so that a high value added system appears.

FIG. 9 is a block diagram showing a conventional transmitting system. As shown in FIG. 9, a camera 2 outputs data on a captured image in the form of an NTSC signal for example. A video recorder 4 subjects the NTSC signal to analog-to-digital conversion to obtain data on a digital frame image, e.g., an REC601 in accordance with a predetermined standard. When receiving as its input the data on the digital frame image as the REC601, an image compressing/transmitting portion 6 encodes the data on the digital frames image by using a predetermined system, e.g., an MPEG system. The image compressing/transmitting portion 6 forms the encoded frame image data into an IP packet, and transmits the resulting IP packet to a monitoring camera or the like through a network. When receiving as its input the IP packet, the monitoring center decodes the IP packet to display the resulting image on a screen or the like. In such a manner, normally, the digital image data is subjected to one-to-one connection between the output of the video decoder 4 and the data processing portions such as the image compressing/transmitting portion 6 in most of the cases.

However, in the case of the conventional image transmitting system, the digital image data is subjected to one-to-one connection between the video decoder 4 and the data processing portion 6. Hence, in the case where a plurality of image inputs captured with a plurality of cameras, respectively, are generated, a plurality of video decoders and data processing portions must be installed in one apparatus. As a result, a circuit scale increases, and the apparatus has much futility and becomes expensive.

In addition, when single image data is subjected to a plurality of image processing, since the image processing portion cannot be configured with one device, it is necessary that a plurality of image processing portions be provided and the image data be inputted to the plurality of image processing portions, respectively. As a result, a circuit scale increases, and the apparatus has much futility and becomes expensive.

In addition, a plurality of data processing portions may subject a plurality of images captured with a plurality of cameras, respectively, in cooperation with one another. For example, image recognition such as invader detection needs to be performed by a plurality of image recognizing portions which are provided so as to correspond to a plurality of images, respectively. Also, in the case where for example, an invader is detected in an image as a result of the image recognition, it is necessary to provide an image composing portion for performing selection of an invader detection image from a plurality of images, addition of a character message indicating the invader detection, and the like. For this reason, such a problem exists that the apparatus configuration becomes complicated.

Moreover, when data on a plurality of images captured with a plurality of cameras, respectively, is composed into data on one image and the resulting composite data is transmitted, the synchronization must be performed since the data on the video image frames is asynchronously transferred with the normal cameras, respectively. For this reason, it is necessary to synchronize the data on a plurality of image frames which is asynchronously transferred from a time base collector provided in the outside, and to perform the synchronization for the data on output image frames themselves by a genlock camera. As a result, such a problem exists that the apparatus is costly.

Patent document 1 (Japanese Patent Laid-open No. Hei 6-6798) discloses that a plurality of video cameras each including means for sending an analog video signal after time-division multiplexing, and a master control device are connected to each other through one bus line, and the master control device demodulates a time-division multiplex signal to display the resulting image.

Patent document 2 (Japanese Patent Laid-open No. hei 5-2442232) discloses that a multi-media system is provided in which a local bus is provided on a board, and the local bus and a PC are connected to each other through interface means, whereby a memory for display, compressing/expanding means, and the like can be readily extended.

Patent document (International Publication WO97/23093) discloses one image input device for receiving as its input data on an analog moving picture, a video decoder, a moving picture compressing portion for converting digitized data on a moving picture into compressed data on a moving picture a moving picture, input interface portion for transferring the compressed data on the moving picture to a main storage, and the like.

However, in the case of the technique disclosed in Patent document 1, since each of the cameras includes the means for time-division multiplexing the data on the analog image, the cameras are expensive similarly to the genlock camera. Also, as shown in FIG. 4 of Patent document 1, for the time division multiplexing means included in each of the cameras, the number of digital image data to be multiplexed, and the order of accommodation thereof are fixed. From these points, the digital image cannot be displayed on a display device in a state in which the number of digital image data, i.e., the number of cameras is made variable. In addition, one monitor is merely connected to the master control device. Hence, it is impossible to monitor an analog image signal on a plurality of monitors, respectively, e.g., to display a single analog image signal on a plurality of monitors, respectively. Moreover, since Patent document 1 dose not disclose a configuration relating to a plurality of image processing portions, for example, another image processing portion, e.g., an image compressing portion cannot execute image processing based on the recognition results obtained from an image recognizing portion.

Since Patent document 2 does not disclose a technique relating to multiplexing of signals of images captured with a plurality of cameras, respectively, the signals of the images captured with a plurality of cameras, respectively, cannot be simultaneously displayed on a display device. In addition, the single analog video signal cannot be displayed on a plurality of monitors, respectively. Moreover, since Patent document 2 does not disclose a configuration of a plurality of image processing portions, for example, another image processing portion, e.g., an image compressing portion cannot execute image processing based on the recognition results obtained from an image recognizing portion.

Patent document 3 cannot solve any of the abovementioned problems since the technique disclosed therein is the same as that which is firstly explained in the prior art.

SUMMARY OF THE INVENTION

It is therefore an object of the present invention to provide an image transmitting apparatus which is capable of processing data on a plurality of frame images by one data processing portion, and of realizing low cost promotion and weight-lightening.

According to an aspect of the present invention, there is provided an image transmitting apparatus including: a plurality of input terminals through which data on digital frame images of one frames captured with video cameras, and synchronous signals synchronized with the data on the digital frame images are inputted, respectively, within a predetermined period of time; a plurality of first frame buffers provided in correspondence to the plurality of input terminals, respectively; a write controlling portion for writing the data on the digital frame images inputted through the plurality of input terminals to the corresponding first frame buffers, respectively, based on the synchronous signals synchronized with the data on the digital frame images within a predetermined period of time; a read clock generating portion for generating a read clock; a read controlling portion for successively enabling the plurality of first frame buffers, reading out the data on the plurality of digital frame images written to the plurality of first frame buffers, respectively, within the predetermined period of time to multiplex the data on the plurality of digital frame images so read into data on one frame, and outputting the multiplexed data and multiplex information representing accommodation positions of the data on the digital frame images accommodated in the multiplexed data based on the read clock generated by the read clock generating portion; an image compressing portion for encoding the data on the digital frame images accommodated in the multiplexed data and represented by the multiplex information; and an image transmitting portion for transmitting the data on the digital frame images encoded by the image compressing portion.

Preferably, the image transmitting apparatus further includes: a second frame buffer; and an image composing portion for writing the data on the digital frame images accommodated in the multiplexed data to the second frame buffer based on the multiplex information, discretely reducing the data on the digital frame images written to the second frame buffer transversely and longitudinally based on the number of digital frame images having data accommodated in the multiplexed data, and composing the data on the plurality of digital frame images into data on a composite frame image of one frame, in which the image compressing portion encodes the composite image data generated by the image compressing portion.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9 is a block diagram showing a configuration of a conventional image transmitting apparatus.

DETAILED DESCRIPTION OF THE PREFERRED EMBODIMENTS

Figure 1:
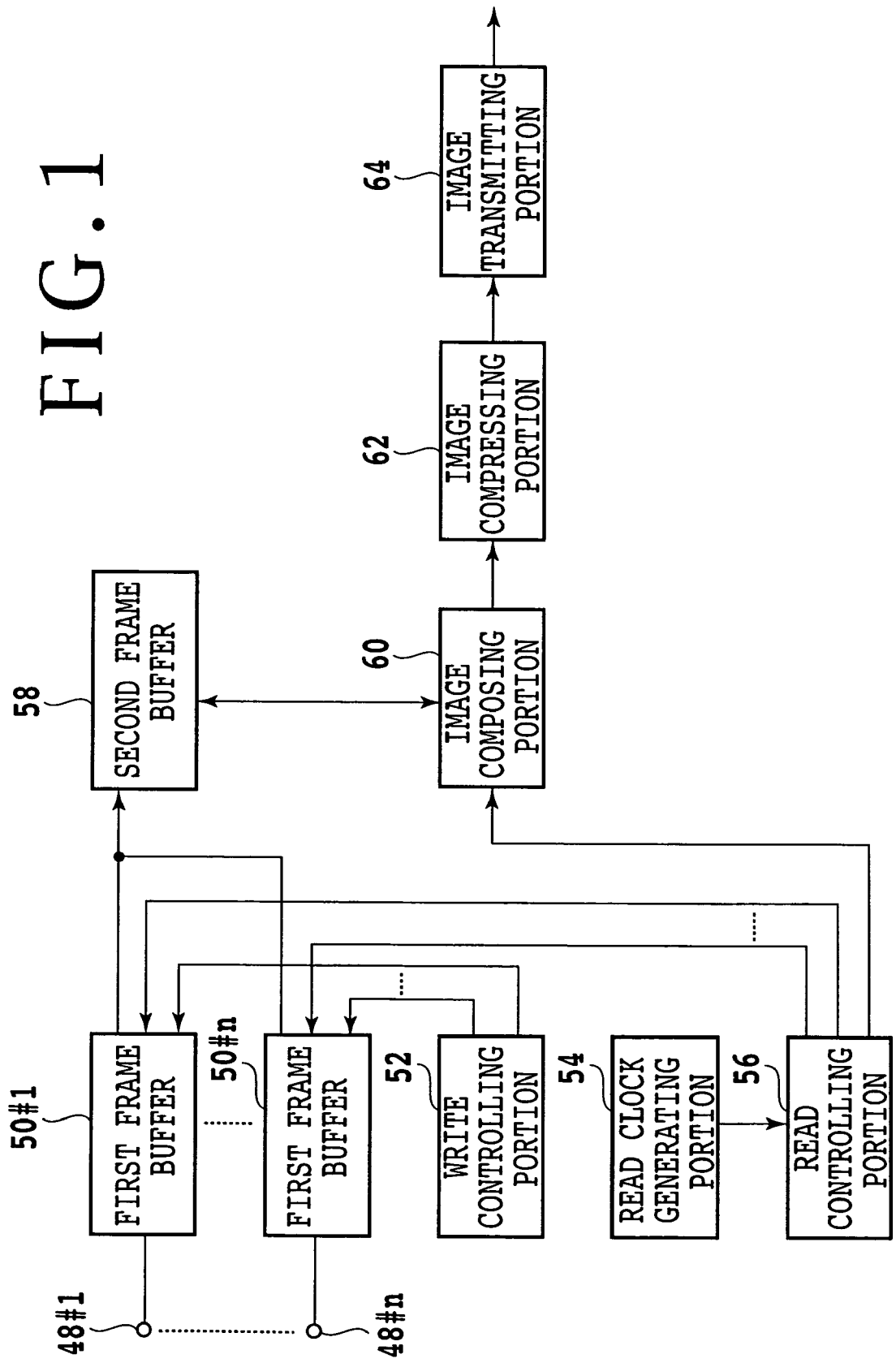
FIG. 1 is a block diagram explaining the principles of the present invention.

Prior to a description of an embodiment of the present invention, the principles of the present invention will hereinafter be described. FIG. 1 is a block diagram explaining the principles of the present invention. As shown in FIG. 1, an image transmitting apparatus includes a plurality of first frame buffers 50#i (i=1, . . . , n), a write controlling portion 52, a read clock generating portion 54, a read controlling portion 56, a second frame buffer 58, an image composing portion 60, an image compressing portion 62, and an image transmitting portion 64. Data on digital frame images of one frame captured with video cameras is inputted though input terminals 48#i (i=1, . . . , n), respectively, within a predetermined period of time. The write controlling portion 52 writes the data on the digital frame images which has been inputted through the input terminals 48# (i=1, . . . , n) to the first frame buffers 50#i (i=1, . . . , n), respectively.

The read clock generating portion 54 generates a read clock. The read controlling portion 56 successively enables a plurality of first frame buffers 50#i (i=1, . . . , n), reads out the data on the input digital frame images which has been written to the first frame buffers 50#i (i=1, . . . , n), respectively, within a predetermined period of time to multiplex the data on the digital frame images so read into data on one frame, and outputs the multiplexed data and multiplex information representing accommodation positions of the data on the frame images accommodated in the multiplexed data in accordance with the read clock generated by the read clock generating portion 54.

The image composing portion 60 writes the data on the digital frame images accommodated in the multiplexed data to the second frame buffer 58 based on the multiplex information, discretely reduces the data on the digital frame images written to the second frame 58 transversely and longitudinally based on the number of digital frame images accommodated in the multiplexed data, and combines the number of digital image data contained within a predetermined period of time with the number of one frame image data captured with the video cameras, respectively, to generate composite image data. The image compressing portion 62 encodes the composite image data obtained from the image composing portion 60. The image transmitting portion 64 transmits the image data encoded by the image compressing portion 62. Since the composite image data which is obtained by multiplexing the data on a plurality of frame images in such a manner is delivered to the data processing portions such as the image composing portion 60, it becomes unnecessary to provide the data processing portion every frame image.

Figure 2:
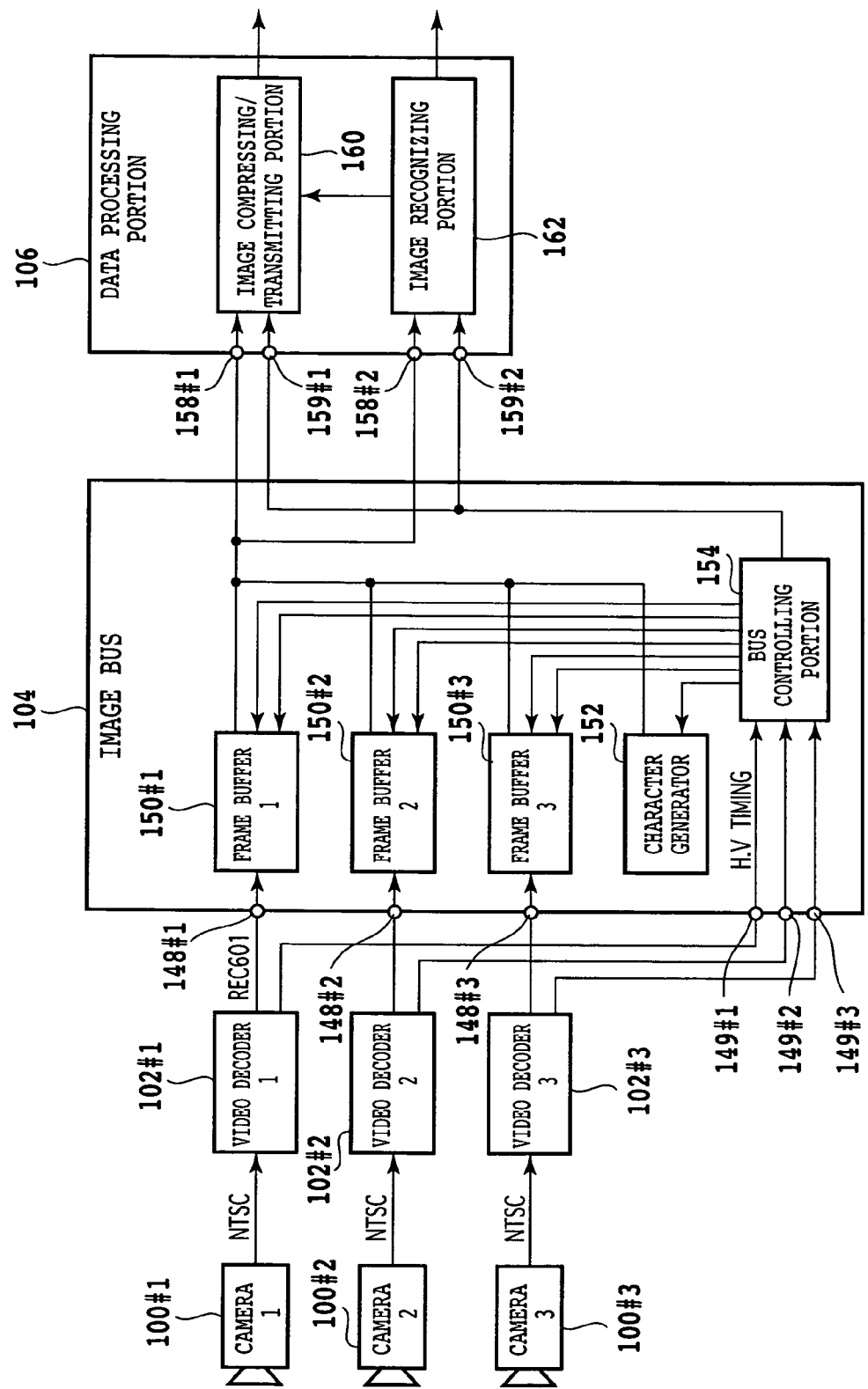
FIG. 2 is a block diagram showing a system configuration of an image transmitting system according to an embodiment of the present invention.

FIG. 2 is a block diagram showing a configuration of an image transmitting system according to an embodiment of the present invention. As shown in FIG. 2, the image transmitting system includes a plurality of cameras 100#i (i=1, 2, 3), a plurality of video decoders 102#i (i=1, 2, 3), an image bus 104, and a data processing portion 106. A plurality of cameras, e.g., the three cameras 100#i (i=1, 2, 3) are installed within a building, and output analog image signals, having a predetermined format, on images captured at predetermined time intervals, e.g., at intervals of 1/30 second, e.g., NTSC signals. A plurality of video decoders 102#i (i=1, 2, 3) are provided so as to correspond to the cameras 100#i (i=1, 2, 3), respectively, and convert the analog signals into digital signals. The NTSC signals is converted into signals of digital frame images each complying with a predetermined standard, for example, RECs 106. Here, since the cameras 100#i output asynchronously the NTSC signals, the video decoders 102#i output asynchronously the RECs 601. Each of the RECs 601 contains a horizontal synchronous signal indicating the last of each line, a vertical synchronous signal indicating the last of the frame images, and a clock representing bits of a frame image signal in addition to the frame image signal.

The image bus 104 includes a plurality of input terminals 148#i and 149#i (i=1, 2, 3), a plurality of frame buffers 150#i (i=1, 2, 3), and a bus controlling portion 154. The input terminals 148#i and 149#i (i=1, 2, 3) are connected to outputs of the video decoders 102#i (i=1, 2, 3), respectively. The frame buffers 150#i (i=1, 2, 3) are connected to the input terminals 148#i (i=1, 2, 3) through input data lines, respectively. The bus controlling portion 154 is connected to the input terminals 149#i (i=1, 2, 3) through input control lines, respectively. The frame buffers 150#i (i=1, 2, 3) are connected to the bus control portion 154 through respective write control lines and respective read control lines. Outputs of the frame buffers 150#i (i=1, 2, 3) and a character generator 152 are connected to one output data line. The one output data line is connected to the data processing portion 106. The one output data line is connected to the data processing portion 106. The character generator 152 is connected to the bus controlling portion 154 through a write control line. An output control line of the bus controlling portion 154 is connected to the data processing portion 106.

Figure 3:
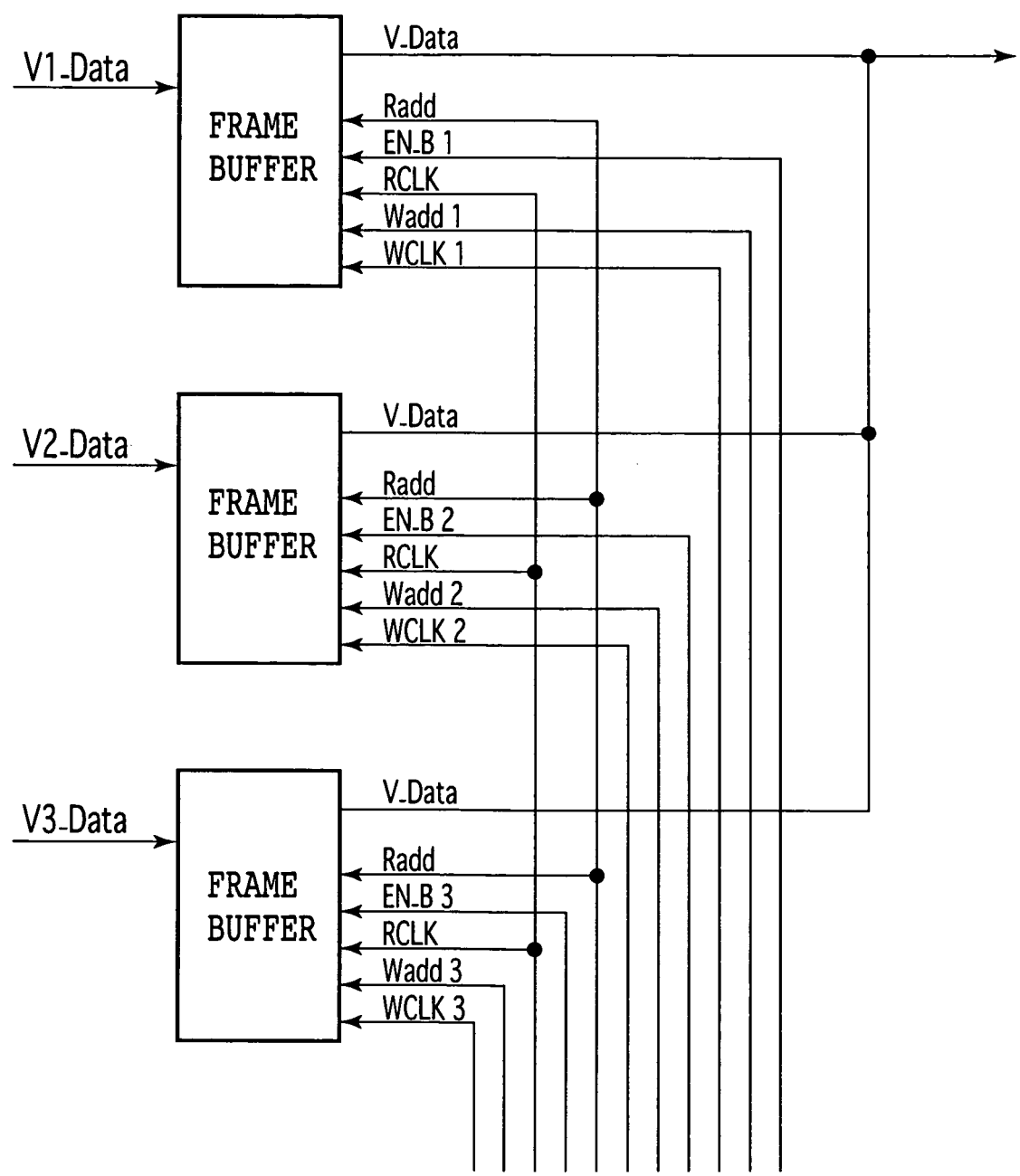
FIG. 3 is a block diagram showing a configuration of frame buffers shown in FIG. 2.

FIG. 3 is a block diagram showing a configuration of the frame buffers 150#i shown in FIG. 2. As shown in FIG. 3, each of the frame buffers 150#i is a dual port memory having a memory area of a size able to contain at least two sheets of frame images. The reason for this is that an operation for reading out the image frame data, and an operation for writing the image frame data can be simultaneously performed. When the frame buffers 150#i receive as their inputs data on write addresses Waddi and write clocks WCLKi through the write control lines, and write image data Vi_Data through the input data lines, the write image data Vi_Data is written to areas of the write addresses Waddi in the frame buffers 150#i synchronously with the write clocks WCLKi, respectively. In addition, when the frame buffers 150#i receive as their inputs data on read addresses Radd, read enable signals EN_Bi, and read clocks RCLK through the read control lines, if the read enable signals EN_Bi become valid, the frame buffers 150#i output read image data V_Data from the areas of the read addresses Radd synchronously with the read clock RCLK, respectively.

When a read enable signal EN_CG inputted to the character generator 152 through the read control line becomes valid, the character generator 152 outputs the character image data corresponding to the read address Radd synchronously with the read clock RCLK, thereby outputting character image frame data V_Data containing specific characters, e.g., characters of "INVADER DETECTION" to a predetermined position on the image frame. Incidentally, instead of provision of the character generator 152, the character image data which is previously stored in a frame buffer may be read out. In this case, since the frame buffer is read only one, one frame buffer has only to be provided.

Figure 4:
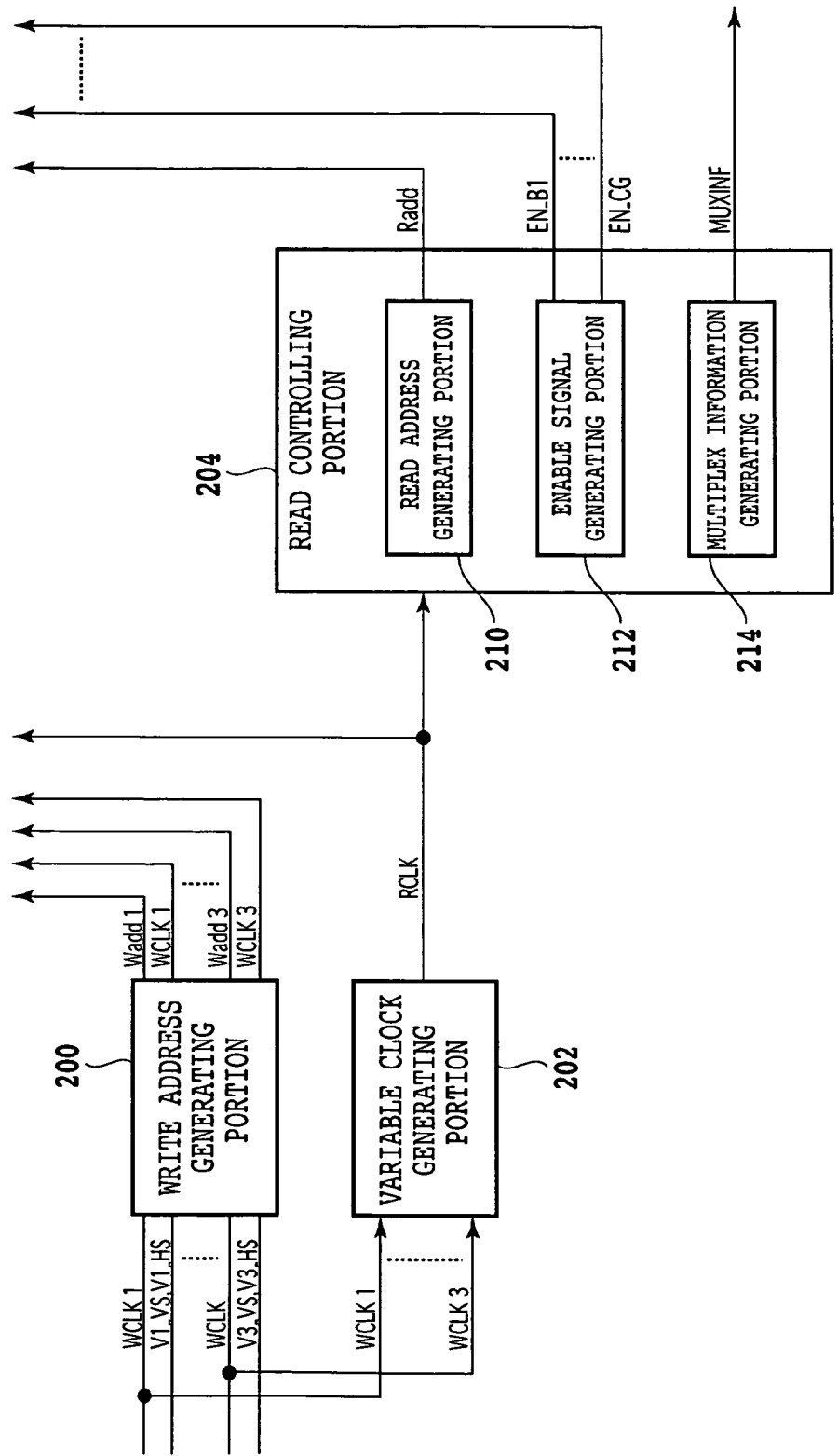
FIG. 4 is a block diagram showing a configuration of a bus controlling portion shown in FIG. 2.
Figure 5:
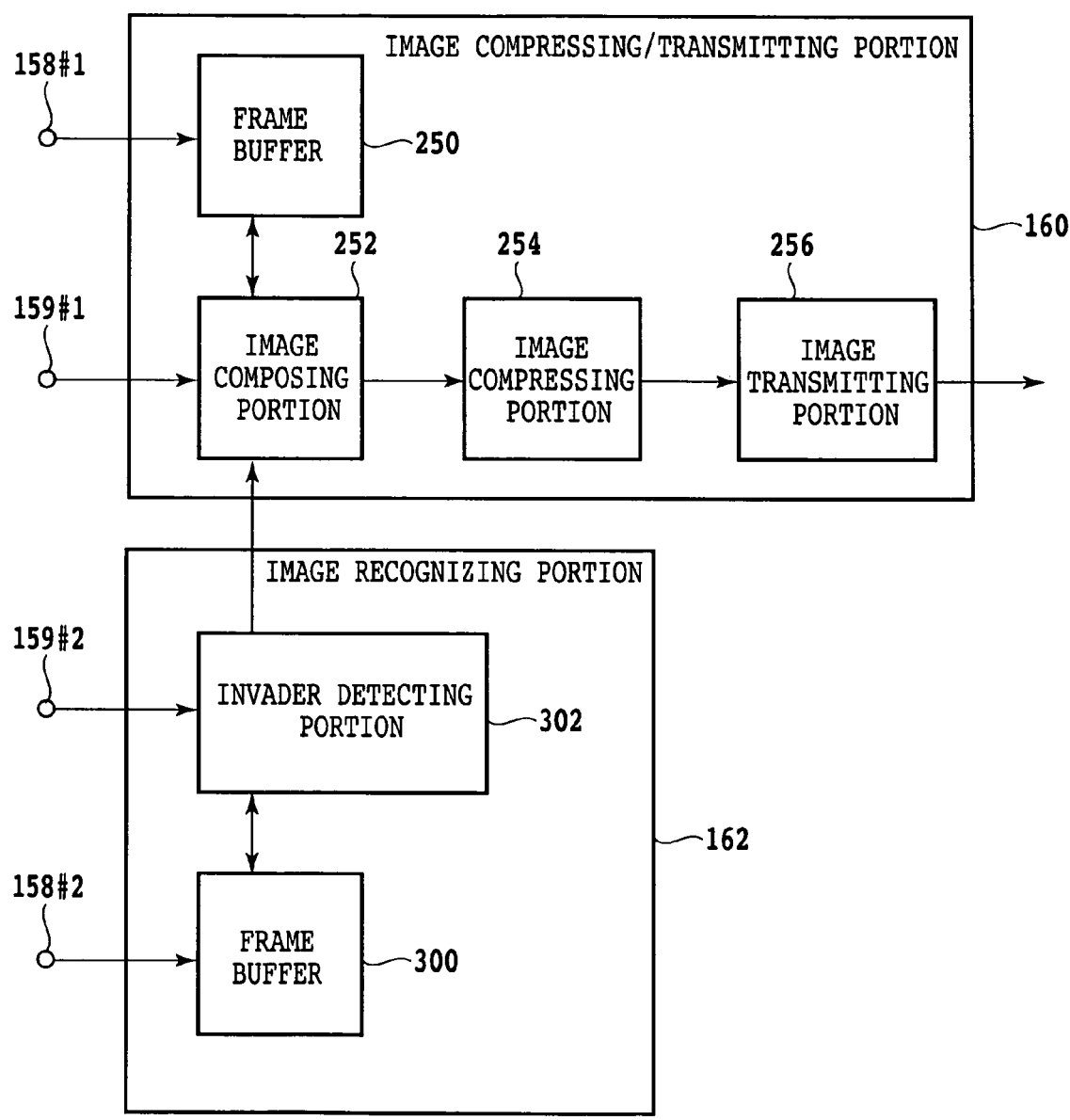
FIG. 5 is a block diagram showing a configuration of a data processing portion shown in FIG. 2.

FIG. 4 is a block diagram showing a configuration of the bus controlling portion 154. As shown in FIG. 4, the bus controlling portion 154 includes a write address generating portion 200, a variable clock generating portion 202, and a read controlling portion 204. The write address generating portion 200 receives as its inputs clocks WCLKi, horizontal synchronous signals Vi_HS, and vertical synchronous signals Vi_VS through input control lines connected to the input terminals 149#i (i=1, 2, 3), respectively. Also, the write address generating portion 200 performs count-up in accordance with the clocks WCLKi in a state in which up to pulses indicated by the horizontal synchronous signals Vi_HS are decided as one line, and pulses indicated by the vertical synchronous signals Vi_VS are decided as the lasts of frame images of one frame, and outputs the data on the write addresses Waddi. When the data is written to up to the lasts in the frame buffers 150#i, the write address generating portion 200 generates the data on the write addresses Waddi so that the data is written to the addresses in and after the heads.

The variable clock generating portion 202 has the following functions. (1) The number of input frame images, e.g., the number of valid clocks WCLKi, i.e., the number of clocks WCLKi each making a level change is detected. While the image bus 104 has the input terminals 148#i and 149#i (i=1, 2, 3) for connection to the video decoders 102#i (i=1, 2, 3), e.g., the three input terminals at the maximum. The reason for this is that since all the three input terminals are not necessarily used depending on the operation, only the data on the frame images which is inputted through the input terminals to which the video decoders 102#i (i=1, 2, 3) are connected, respectively, are multiplexed, whereby for example, the frequency of the read clock RCLK is kept to a minimum to reduce the power consumption. (2) One of the valid clocks based on the number "n" of detected frame images, e.g., the read clock RCLK having a clock frequency which is (n+1) times as high as that of the clock WCLK1 is generated.

The read controlling portion 204 includes a read address generating portion 210, an enable signal generating portion 212, and a multiplex information generating portion 214. The read address generating portion 210 makes count-up in accordance with the clock RCLK for a predetermined period of time for which enable signals EN_Bi (i=1, 2, 3) and EN_CG which will be described later are valid, and generates data on the read address Radd based on which the data on the frame images of one frames is read out. When the read address Radd agrees with each of the final addresses of the frame buffers 150#i, the read address generating portion 210 generates the data on the read address Radd so that the data is read out from the addresses in and after the heads in the frame buffers 150#i. At this time, since the frequency of the read clock RCLK is four times as high as that of each of the write clocks WCLKi, the data on the frame images is read out at a speed which is four times as high as the write speed.

The enable signal generating portion 212 successively counts the read clocks RCLK for the frame buffers 150#i corresponding to the valid clocks WCLKi, and makes the enable signals EN_Bi (i=1, 2, 3) valid only for a read period of time ((one frame period of time based on the REC601)/(n+1)) for one frame image. Thereafter, the enable signal generating portion 212 makes the enable signal EN_CG valid only for a read period of time for one frame image. As a result, the frame image data for the number of valid clocks WCLKi and the character frame image data V_Data are multiplexed for one frame period of time based on the REC601, i.e., for 1/30 second. At this time, the data on the frame images and the data on the character frame images are successively read out from their heads up to their lasts for a period of time for which the enable signals EN_Bi and EN_CG are valid. Thus, the synchronization is made for the frame images and the character frame image accommodated in the multiplexed data V_Data. This operation is repeatedly performed. The multiplex information generating portion 214 generates information representing the read clock RCLK, the head positions of the frame images on which the data is multiplexed, and the last positions of the lines of the frame images in the form of multiplex information MUXINF.

Figure 6:
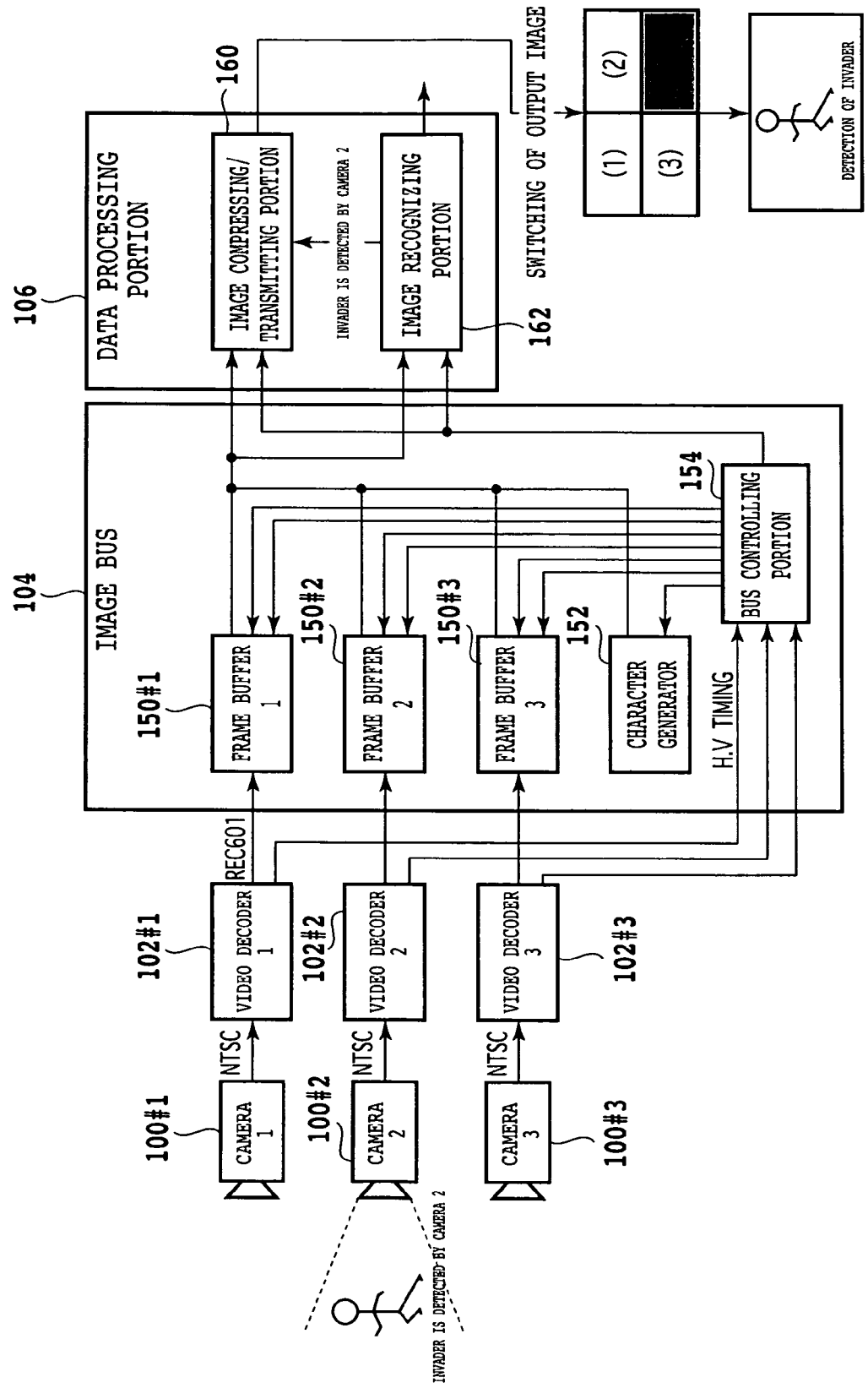
FIG. 6 is a diagram explaining an operation of the image transmitting system shown in FIG. 2.

FIG. 6 is a block diagram showing a configuration of the data processing portion 106 shown in FIG. 2. The data processing portion 106 includes a plurality of image processing portions connected to a plurality of input terminals 158#i (i=1, 2) and 159#i (i=1, 2), e.g., an image compressing/transmitting portion 160 and an image recognizing portion 162. The multiplexed data V_Data is inputted through the input terminals 158# (i=1, 2). The multiplex information MUXINF is inputted through the input terminals 159#i (i=1, 2). The image processing portions may also be other portions such as a monitor controlling portion for displaying data on one or a plurality of monitors and an image accumulating portion for accumulating therein the compressed encoded image data instead of the image compressing/transmitting portion 160 and the image recognizing portion 162.

The image compressing/transmitting portion 160 includes a frame buffer 250, an image composing portion 252, an image compressing portion 254, and an image transmitting portion 256. The frame buffer 250 is a dual port memory for storing therein the multiplexed data V_Data, and has a storage area for at least two frames.

The image composing portion 252 has the following functions. (1) The image data is written to the frame buffer 250 every line of each frame image having the data accommodated in the multiplexed data V_Data on the multiplex information MUXINF. (2) When the image recognizing portion 162 informs the image composing portion 252 of the image recognition result from, e.g., the effect that an invader is detected together with the number of the image frame containing an image of the invader, the image composing portion 252 composes the data on the frame image containing the image of the invader and the data on the character image frame with each other. The composition means that the data on only the character portion in the character image frame is overwritten to the data on the frame image containing the image of the invader. (3) When for example, no invader is detected based on the recognition results from the image recognizing portion 162, the image composing portion 252 makes the composition so that all the frame images are contained in one sheet of frame. At this time, since the number of input frame images is variable, a form based on which a plurality of frame images are displayed on the display device from the data on the number of frames accommodated in the multiplexed data, i.e., how many divided screens a plurality of frame images are displayed on is obtained. For the rate at which the data on the image frame stored in the frame buffer 250 is discretely reduced, for example, when the data on the three sheets of frame images is multiplexed, the screen is vertically and horizontally divided into four screen parts, and the corresponding frame images are displayed on the divided screen parts, respectively. Hence, the data on each of the image frames is discretely reduced to half transversely and longitudinally, thereby generating the composite frame image.

The image compressing portion 254 encodes the data on the composite frame image obtained from the image composing portion 252 by using the MPEG system or the like to compress the data on the image. The image transmitting portion 256 transmits an IP packet into which the data on the image compressed by the image compressing portion 254 is formed to a monitoring center or the like connected to the image transmitting system through the Internet.

The image recognizing portion 162 executes processing for edge extraction from the frame image, an interframe difference, pattern matching and the like to recognize the image intended to be recognized. The image recognizing portion 162, for example, includes a frame buffer 300 and an invader detecting portion 302. The frame buffer 300 is substantially identical to the frame buffer 250. The invader detecting portion 302 performs image recognition for monitoring, and monitors images captured with a plurality of cameras (three cameras in this embodiment) at all times for the data on the image frames stored in the frame buffer 300 for the purpose of detecting an invader. When the invader is detected, the invader detecting portion 300 outputs the data on the order accommodated in the multiplexed data V_Data containing the data on the invader detection image together with the effect that the invader is detected.

FIG. 6 is a block diagram explaining the operation of the image transmitting system shown in FIG. 2. The three cameras 100#i (i=1, 2, 3) installed in a building or the like output data on analog image frames in the form of NTSC signals. The video decoders 102#i (i=1, 2, 3) convert the NTSC signals into RECs601 to output the frame image data Vi_Data, the clock signals WCLKi, the horizontal synchronous signals Vi_HS, and the vertical synchronous signals Vi_VS, respectively.

Figure 7:
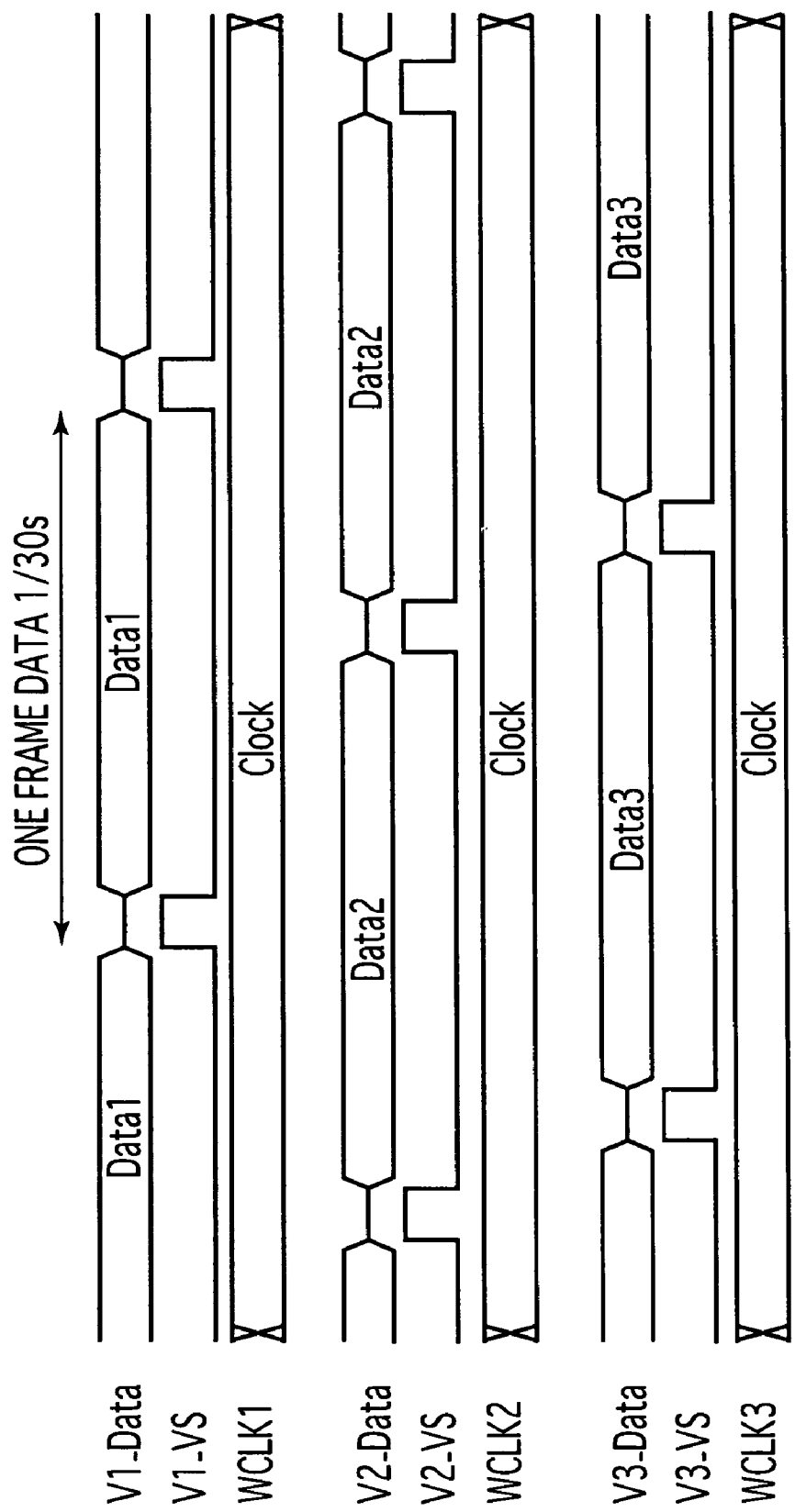
FIG. 7 is a time chart explaining processing for writing data on image frames.

FIG. 7 is a time chart explaining processing for writing the frame image data. The bus controlling portion 154 generates the data on the write addresses Waddi synchronously with the clock signals WCLKi, the horizontal synchronous signals Vi_HS, and the vertical synchronous signals Vi_VS which are inputted thereto through the input terminals 149#i (i=1, 2, 3), and writes the frame image data Vi_Data which is outputted from the video decoders 102#i (i=1, 2, 3) to be inputted through the input terminals 148#i (i=1, 2, 3) to the frame buffers 150#i (i=1, 2, 3), respectively.

Figure 8:
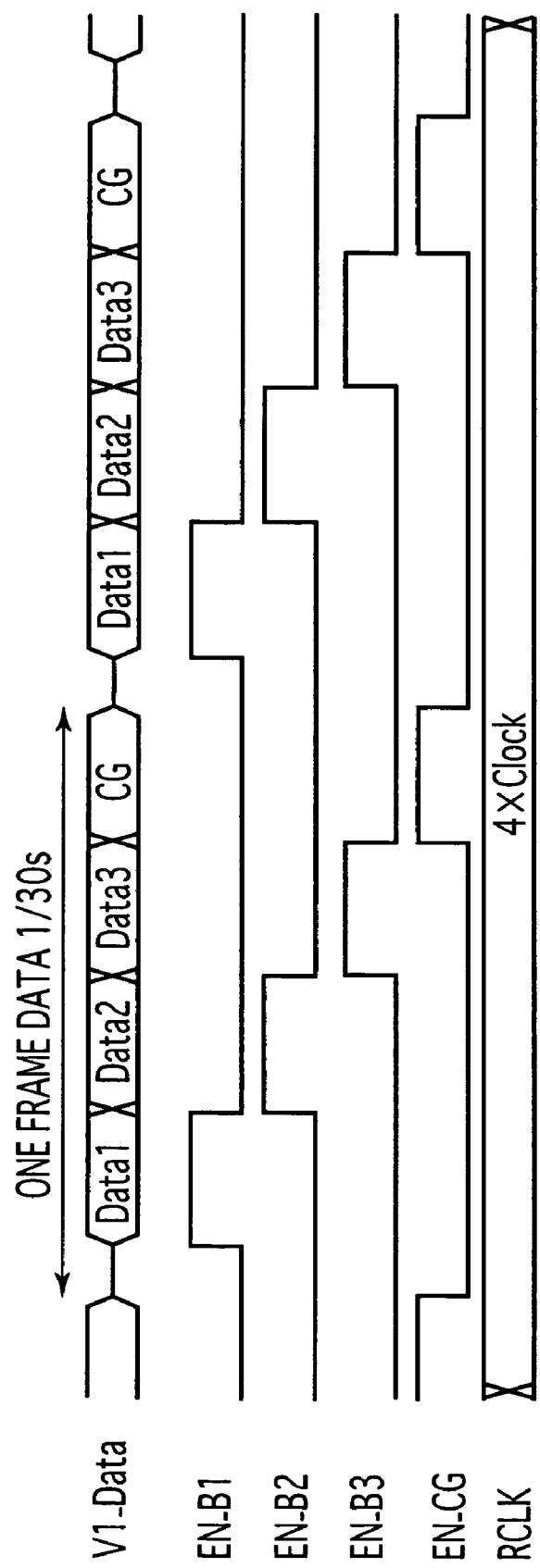
FIG. 8 is a time chart explaining processing for reading out data on image frames.

FIG. 8 is a time chart explaining processing for reading out the frame image data. The bus controlling portion 154 obtains the number of input images based on the clocks WCLKi (i=1, 2, 3) or the like which are inputted thereto through the input terminals 149#i (i=1, 2, 3) connected to the video decoders 152#i (i=1, 2, 3), respectively. In this embodiment, the bus controlling portion 154 obtains the three input images. The bus controlling portion 154 generates a read clock RCLK having a clock frequency four times as high as that of one of the input clocks, e.g., the clock WCLK1 based on the clock WCLK1. The bus controlling portion 154 successively generates read enable signals EN_Bi (i=1, 2, 3) and EN_CG, and data on the read address Radd synchronously with the read clock RCLK so that the read enable signals EN_Bi (i=1, 2, 3) and EN_CG become valid within four time parts, respectively, into which one frame time (1/30 second) is divided.

For example, the bus controlling portion 154 generates the read enable signals EN_Bi (i=1, 2, 3) for the order of the frame buffers 150#1, 150#2, 150#3, and the character generator 152. The read address Radd is generated in the every order of the frame buffers 150#1, 150#2, 150#3, and the character generator 152. However, the read address Radd is the corresponding address from the first to the last of the frame images for a period of time for which the read enable signals EN_Bi (i=1, 2, 3) are valid. Thus, the read addresses Radd become successively identical to one another. In addition, the read address Radd is the corresponding address from the first to the last of the character image frames for a period of time for which the read enable signal EN_CG is valid.

When the read enable signals EN_Bi become valid, the frame buffers 150#i read out the image data Datai from the areas corresponding to the read address Radd, respectively. When the read enable signal EN_CG becomes valid, the character generator 152 generates the character data CG corresponding to the read address Radd. As a result, the four frame image data Datai (i=1, 2, 3) and the character data CG which are outputted from the frame buffers 150#i (i=1, 2, 3) and the character generator 152, respectively, are multiplexed into the multiplexed data V_Data as shown in FIG. 8. Also, since the read address Radd is provided from the head address up to the last address of the frame for periods of time for which the read enable signals EN_Bi (i=1, 2, 3) and EN_CG are valid, the synchronization is made for the multiplexed image frames.

The bus controlling portion 154 outputs the multiplex information MUXINF representing the heads of the image frame data Datai (i=1, 2, 3) and the character data CG which are multiplexed into the multiplexed data V_Data, and the ends of each line together with the read clock RCLK to the data processing portion 106. The image recognizing portion 162 receives as its inputs the frame image data Datai (i=1, 2, 3) of the multiplexed data V_Data in accordance with the multiplex information MUXINF, and performs an arithmetic operation for obtaining a difference between the data on the frame images before and after each of the data on the frame images, thereby detecting the invader. When the invader is detected, the image recognizing portion 162 outputs the accommodation number of the data on the invader detection image accommodated in the multiplexed data V_Data together with the effect that the invader is detected. For example, if the invader is detected in the image frame captured with the camera 100#2 as shown in FIG. 6, the image recognizing portion 162 outputs the effect that the invader is detected with the camera 100#2 (accommodation number 2) to the image compressing/transmitting portion 160.

When the image recognizing portion 162 informs the image compressing/transmitting portion 160 of the fact that no invader is detected, since the frame images are displayed on the corresponding screen parts into which the original screen is divided by the number of image frames of the multiplexed data V_Data, after discretely reducing the data on the frame images accommodated in the multiplexed data V_Data into the data on one frame image in accordance with the multiplex information MUXINF, the image compressing/transmitting portion 160 encodes the data on the one frame image to compress the resulting data by the MPEG system or the like. For example, since the frame images captured with the three cameras 100#1, 100#2, and 100#3, respectively, are displayed on the corresponding screen parts obtained through the four-division, respectively, the data on each of the frame images is discretely reduced transversely and longitudinally to half. On the other hand, when the image recognizing portion 162 informs the image compressing/transmitting portion 160 of the fact that the invader is detected, after composing the data on the invader detection frame image and the date on the character frame image accommodated in the multiplexed data V_data into the data on one frame image, the image compressing/transmitting portion 160 encodes the resulting composite data to compress the data on the image by using the MPEG system or the like.

The image compressing/transmitting portion 160 forms the compressed image data into the IP packet and sends the resulting IP packet to the monitoring center (not shown) or the like through the Internet. The monitoring center or the like receives the IP packet to decode the IP packet, and the resulting data is displayed on the screen as shown in FIG. 6. When no invader is detected, the images for the three frames are displayed on the divided screen parts. For example, the frame images captured with the cameras 100#i (i=1, 2, 3) are displayed in image areas designated by (i) (i=1, 2, 3) as shown in FIG. 6. On the other hand, when the invader is detected, as shown in FIG. 6, an invader detection frame image captured with the camera 100#2 is displayed together with the character of "INVADER DETECTION" on the full screen.

According to this embodiment described above, since the data on a plurality of frame images is synchronized with one another and multiplexed by the image bus, the data on a plurality of images can be processed in the device of one data processing portion, and the data on the images can be composed with one another. As a result, it is possible to realize the weight-lightening and the low cost. Since the data on the same image is processed based on the image recognition results within the data processing portion, it is possible to provide the high value added complex type image transmitting apparatus having a light and inexpensive configuration.

In addition, while this embodiment has been described by giving the case where the data on the frame images captured with a plurality of cameras, respectively, is multiplexed as an example, even for a single analog image signal of an image captured with one camera, the configuration shown in FIG. 2 can be realized without being changed. Hence, a plurality of applications can be processed in the device of one data processing portion. For example, a plurality of image processing portions are configured in the form of an image display controlling portion for performing display control for a plurality of monitors, and a plurality of monitors are connected to output terminals of the image display controlling portion, whereby a single image can also be displayed on a plurality of monitors, respectively.

As set forth hereinabove, according to the present invention, since the data on a plurality of frame images is synchronized with one another and multiplexed by the image bus, the data on a plurality of images can be processed in the device of one data processing portion, and can be composed with one another. Consequently, it is possible to realize the weight-lightening and the low cost.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An image transmitting apparatus comprising:
a plurality of input terminals through which data on digital frame images of one frames, and synchronous signals synchronized with the data on the digital frame images are inputted, respectively, within a predetermined period of time;
a plurality of first frame buffers provided in correspondence to said plurality of input terminals, respectively;
a write controlling portion which writes the data on the digital frame images inputted through said plurality of input terminals to the corresponding first frame buffers, respectively, based on the synchronous signals synchronized with the data on the digital frame images;
a read clock generating portion which generates a read clock, a frequency of which is determined based on both the number of input terminals through which the data on the digital frame images is inputted and one write clock which is inputted together with the data on the input digital frame image, and is higher than a frequency of the write clock;
a read controlling portion which successively enables only the first frame buffers to which the data on the digital frame image is written among said plurality of first frame buffers, only for a period of time the frame images are read out, reads out the data on the plurality of digital frame images written to said plurality of first frame buffers, respectively, within the predetermined period of time to multiplex the data on the plurality of digital frame images which is read out, into data on one frame, and outputs the multiplexed data and multiplex information representing accommodation positions of the data on the digital frame images accommodated in the multiplexed data based on the read clock generated by said read clock generating portion;
an image compressing portion which encodes the data on the digital frame images accommodated in the multiplexed data and represented by the multiplex information; and
an image transmitting portion which transmits the data on the digital frame images encoded by said image compressing portion.

2. The image transmitting apparatus according to claim 1, further comprising:
a second frame buffer; and
an image composing portion which writes the data on the digital frame images accommodated in the multiplexed data to said second frame buffer based on the multiplex information, discretely reduces the data on the digital frame images written to said second frame buffer transversely and longitudinally based on the number of digital frame images having data accommodated in the multiplexed data, and composes the data on the plurality of digital frame images into data on a composite frame image of one frame,
wherein said image compressing portion encodes the composite image data generated by said image compressing portion.

3. The image transmitting apparatus according to claim 2, further comprising:
a character generator which generates data on a character image frame containing predetermined characters in accordance with the control made by said read controlling portion,
wherein said read controlling portion controls said character generator so that the data on the character image frame is multiplexed with the data on the multiplexed data within the predetermined period of time.

4. The image transmitting apparatus according to claim 3, further comprising:
an image recognizing portion which detects an invader from the data on the digital frame image contained in the multiplexed data based on the multiplex information, and when the invader is detected, informs said image composing portion of the fact that the invader is detected and information representing data on the digital frame image which is accommodated in the multiplexed data and from which the invader is detected.

5. The image transmitting apparatus according to claim 4, wherein when said image recognizing portion informs said image composing portion of the fact that no invader is detected, said image composing portion composes the frame image data except for the character image data stored in said second frame buffer, and when said image recognizing portion informs said image composing portion of the fact that the invader is detected, said image composing portion composes the data on the digital frame image from which the invader is detected and the data on the character frame image, stored in said second frame buffer, with each other.

6. The image transmitting apparatus according to claim 1, further comprising:
a plurality of second input terminals connected to signal lines through which the multiplexed data and the multiplex information are inputted, respectively; and
a plurality of image processing portions connected to said second input terminals, respectively, which execute image processing for the data on the digital frame images accumulated in the multiplexed data.

7. An image transmitting system comprising:
a plurality of video cameras which output data on analog frame images, respectively;
a plurality of video decoders which output data on digital frame images of one frames into which the data on the analog frame images is encoded, respectively, and synchronous signals synchronized with the data on the digital frame images within a predetermined period of time;
a plurality of input terminals which are connected to said plurality of video decoders, respectively, and through which the data on the digital frame images and the synchronous signals are inputted, respectively;
a plurality of first frame buffers provided in correspondence to said plurality of input terminals, respectively;
a write controlling portion which writes the data on the digital frame images inputted through said plurality of input terminals to the corresponding first frame buffers, respectively, based on the synchronous signals synchronized with the data on the digital frame images within a predetermined period of time;
a read clock generating portion which generates a read clock, a frequency of which is determined based on both the number of input terminals through which the data on the digital frame images is inputted and one write clock which is inputted together with the data on the input digital frame image, and is higher than a frequency of the write clock;

a read controlling portion which successively enables only the first frame buffers to which the data on the digital frame image is written among said plurality of first frame buffers, only for a period of time the frame images are read out, reads out the data on the plurality of digital frame images written to said plurality of first frame buffers, respectively, within the predetermined period of time to multiplex the data on the plurality of digital frame images which is read out, into data on one frame, and outputs the multiplexed data and multiplex information representing accommodation positions of the data on the digital frame images accommodated in the multiplexed data based on the read clock generated by said read clock generating portion;

an image compressing portion which encodes the data on the digital frame images accommodated in the multiplexed data and represented by the multiplex information; and an image transmitting portion which transmits the data on the digital frame images encoded by said image compressing portion.

8. An image transmitting method performed in an image transmitting apparatus which has a plurality of input terminals through which data on digital frame images and synchronous signals synchronized with the data on the digital frame images are inputted, respectively, within a predetermined period of time; and a plurality of first frame buffers provided in correspondence to said plurality of input terminals, respectively, the image transmitting method comprising:

writing the data on the digital frame images inputted through said plurality of input terminals to the corresponding first frame buffers, respectively, based on the synchronous signals synchronized with the data on the digital frame images;

generating a read clock, a frequency of which is determined based on both the number of input terminals through which the data on the digital frame images is inputted and one write clock which is inputted together with the data on the input digital frame image, and is higher than a frequency of the write clock;

enabling only the first frame buffers to which the data on the digital frame image is written among said plurality of first frame buffers successively, only for a period of time the frame images are read out;

reading out the data on the digital frame images written to said plurality of first frame buffers, respectively, within the predetermined period of time to multiplex the data on the plurality of digital frame images which is read out, into data on one frame;

outputting the multiplexed data and multiplex information representing accommodation positions of the data on the digital frame images accommodated in the multiplexed data based on a read clock;

encoding the data on the digital frame images accommodated in the multiplexed data and represented by the multiplex information; and transmitting the data on the digital frame images encoded.

\* \* \* \* \*